(12) United States Patent
Geck et al.

(10) Patent No.: US 6,184,406 B1
(45) Date of Patent: Feb. 6, 2001

(54) AQUEOUS EMULSIONS CONTAINING ORGANOHYDROPOLYSILOXANES

(75) Inventors: Michael Geck, Burghausen; Enno Funk, Mehring; Petra Stinglhammer, Kirchdorf; Bernward Deubzer, Burghausen; Gerhard Preiner, Burghausen, all of (DE)

(73) Assignee: Wacker-Chemie GmbH, München (DE)

( * ) Notice: Under 35 U.S.C. 154(b), the term of this patent shall be extended for 0 days.

(21) Appl. No.: 09/462,662

(22) PCT Filed: Jul. 2, 1998

(86) PCT No.: PCT/EP98/04101

§ 371 Date: Jan. 26, 2000

§ 102(e) Date: Jan. 26, 2000

(87) PCT Pub. No.: WO99/02581

PCT Pub. Date: Jan. 21, 1999

(30) Foreign Application Priority Data

Jul. 11, 1997 (DE) ............................... 197 29 806

(51) Int. Cl.$^7$ ....................................... C07F 7/08
(52) U.S. Cl. ..................... 556/401; 106/287.14
(58) Field of Search ...................... 106/287.14; 556/401

(56) References Cited

U.S. PATENT DOCUMENTS 4,690,967    9/1987    LaGarde et al. .

FOREIGN PATENT DOCUMENTS

| 1 161 419 | 1/1964 | (DE) . |
| 1 215 929 | 5/1966 | (DE) . |
| 2 157 580 | 6/1972 | (DE) . |
| 195 17 346 | 11/1996 | (DE) . |
| 0 043 985 | 10/1984 | (EP) . |
| 0 314 955 | 1/1995 | (EP) . |
| 0 819 735 | 1/1998 | (EP) . |
| 1 336 195 | 11/1973 | (GB) . |

OTHER PUBLICATIONS

English Abstract corresponding to DE–B 1161419.

English Abstract corresponding to DE–B 1215929.

Derwent Abstract corresponding to EP–B 43985 (AN 1982–06146E).

Derwent Abstract corresponding to DE 19517346 (AN 1996–518574).

Derwent Abstract corresponding to EP 0819735 (AN 1998–078820).

Melliand Textilberichte 41, 1125 (1960).

*Primary Examiner*—Paul F. Shaver
(74) *Attorney, Agent, or Firm*—Brooks & Kushman P.C.

(57) ABSTRACT

The invention relates to aqueous emulsions containing (A) organo-hydrogenated polysiloxanes optionally mixed with organopolysiloxanes free of Si linked hydrogen and organyloxy groups, (B) organopolysiloxanes containing organyloxy groups as stabilizers, (C) emulsifiers and (D) water.

14 Claims, No Drawings

AQUEOUS EMULSIONS CONTAINING ORGANOHYDROPOLYSILOXANES

TECHNICAL FIELD

The invention relates to aqueous stable emulsions which comprise organohydropolysiloxanes and to a process for preparing them.

DESCRIPTION OF THE RELATED ART

Aqueous emulsions comprising organohydropolysiloxanes and the uses thereof are widely known, such as, for example, for the preparation of antiadhesion silicone coatings on paper or film by means of crosslinking reaction (hydrosilylation), the preparation of water-repellent coatings by means of crosslinking reaction (condensation), hydrophobicizing impregnation of textiles, leather or paper, as release agents for bladder coating in tire manufacture, and for the hydrophobicization of building materials.

The stability of organohydropolysiloxane emulsions is a problem, owing to the susceptibility of the Si-H bond to hydrolysis. The reaction with water in this case frequently gives rise to silanol groups and gaseous hydrogen. Measures to improve the stability of organchydropolysiloxane emulsions and to reduce the elimination of hydrogen have already been described.

In Melliand Textilberichte 41, 1125 (1960) it is disclosed that methylhydropolysiloxane emulsions show a stability optimum at an established pH of 3.5–4 depending on the acid used.

The stabilization of specific alkylhydropolysiloxane emulsions prepared using cationic emulsifier, by adding aminocarboxylic acids and establishing a pH at 2.5–5, is described in DE-B 1 161 419 (Bayer AG, issued Jan. 16, 1964). DE-A 21 57 580 (Rhone Poulenc S.A., issued Jun. 22, 1972) and the corresponding GB-A 1336195 claim specific amino acid derivatives for stabilizing alkylhydropolysiloxane emulsions.

The addition of water-soluble, saturated aliphatic aldehydes having at least two C atoms for stabilizing emulsions containing organohydropolysiloxanes is described in DE-B 1 215 929 (Wacker-Chemie GmbH, issued May 5, 1966). EP-B-43 985 (Bayer AG, issued Oct. 3, 1984) discloses alkylhydropolysiloxane emulsions having improved low-temperature and gassing stability, which is achieved by adding trihydric alcohols and mono- or dihydric alcohols.

EP-B 314 955 (General Electric Co., issued Jan. 11, 1995) claims the stabilization of emulsions of organopolysiloxanes containing hydrogen groups by adding hydroxy-functional organopolysiloxanes, preferably at neutral pH.

SUMMARY OF THE INVENTION

Subject matter of the invention are aqueous emulsions comprising
(A) organohydropolysiloxanes alone or in a mixture with organopolysiloxanes free from Si-bonded hydrogen and organyloxy groups,
(B) organopolysiloxanes containing organyloxy groups, as stabilizers,
(C) emulsifiers, and
(D) water.

DETAILED DESCRIPTION OF THE INVENTION

In the context of the present invention the term organopolysiloxanes is intended to embrace polymeric, oligomeric and dimeric siloxanes.

The emulsions of the invention have an average particle diameter of preferably 0.05–10 μm, with particular preference of 0.1–3 μm.

As component A it is possible to use all organohydrosiloxanes known to date and also, if desired, further organopolysiloxanes possessing neither Si-bonded hydrogen nor organyloxy groups.

The organohydropolysiloxanes present in the emulsions of the invention preferably comprise those comprising units of the general formula

$$R_a H_b SiO_{(4-a-b)/2} \quad (I)$$

where
R can be identical or different and denotes SiC-bonded, unsubstituted or substituted hydrocarbon radicals having 1 to 18 carbon atoms,
a is equal to 0, 1, 2 or 3, on average from 0.5 to 2, and
b is equal to 0, 1 or 2, on average from 0.005 to 1,
with the proviso that the sum of a+b is less than or equal to 3 and at least one Si-bonded hydrogen atom is present per molecule.

Examples of R are alkyl radicals, such as the methyl, ethyl, n-propyl, isopropyl, 1-n-butyl, 2-n-butyl, isobutyl, tert-butyl, n-pentyl, isopentyl, neopentyl, tert-pentyl radicals; hexyl radicals, such as the n-hexyl radical; heptyl radicals, such as the n-heptyl radical; octyl radicals, such as the n-octyl radical and isooctyl radicals, such as the 2,2,4-trimethylpentyl radical; nonyl radicals, such as the n-nonyl radical; decyl radicals, such as the n-decyl radical; dodecyl radicals, such as the n-dodecyl radical; octadecyl radicals, such as the n-octadecyl radical; cycloalkyl radicals, such as the cyclopentyl, cyclohexyl, cycloheptyl radical and methylcyclohexyl radicals; alkenyl radicals, such as the vinyl, 1-propenyl and the 2-propenyl radical, aryl radicals, such as the phenyl, naphthyl, anthryl and phenanthryl radical; alkaryl radicals, such as o-, m-, p-tolyl radicals; xylyl radicals and ethylphenyl radicals; and aralkyl radicals, such as the benzyl radical, the α- and the β-phenylethyl radical.

Examples of substituted radicals R are haloalkyl radicals, such as the 3,3,3-trifluoro-n-propyl radical, the 2,2,2',2', 2'-hexafluoroisopropyl radical, the heptafluoroisopropyl radical and haloaryl radicals, such as the o-, m- and p-chlorophenyl radical.

Radical R preferably comprises the methyl, vinyl and the phenyl radical, the methyl radical being particularly preferred.

Preferably, at least 75% of the Si-bonded radicals R in the organohydropolysiloxane comprising units of the formula (I) are methyl radicals.

The amount of Si-bonded hydrogen in the organohydropolysiloxane used in accordance with the invention is preferably from 0.001 to 2% by weight.

The organohydropolysiloxane which is present in the emulsions of the invention can comprise a resin which is liquid at room temperature or an oil.

The organohydropolysiloxane comprising units of the formula (I) comprises with particular preference those which contain $HSiO_{1.5}$ units, $HSiCH_3O$ units, $HSi(CH_3)_2O_{0.5}$ units and $H_2SiO$ units, and also $(CH_3)_3SiO_{0.5}$, $(CH_3)_2SiO$ and $CH_3SiO_{1.5}$ units.

Preferably, the organohydropolysiloxane present in the emulsions of the invention is essentially linear with a viscosity of preferably from 1 to 100,000. $mm^2/s$, with particular preference from 5 to 20,000 $mm^2/s$, in each case at 25° C.

Examples of organohydropolysiloxanes comprising units of the formula (I) are:

$(CH_3)_3SiO—[HSiCH_3O]_x—Si(CH_3)_3$ where x=10–200;

$(CH_3)_3SiO—[HSiCH_3O]_x—[(CH_3)_2SiO]_y—Si(CH_3)_3$ where x:y=1:0.5 to 1.25 and with viscosities of 20–1000 $mm^2/s$;

$H—[Si(CH_3)_2O]_n—Si(CH_3)_2H$ where n=5–200.

Further examples are:

$(CH_3)_3SiO—[HSiCH_3O]_{50}—Si(CH_3)_3$;

$(CH_3)_3SiO—[HSiCH_3O]_{30}—[(CH_3)_2SiO]_{20}—Si(CH_3)_3$;

$(CH_3)_3SiO—[HSiCH_3O]_5—[(CH_3)_2SiO]_{75}—Si(CH_3)_3$;

$H—[Si(CH_3)_2O]_{15}—Si(CH_3)_2H$; $H—[Si(CH_3)_2O]_{200}—Si(CH_3)_2H$.

The organopolysiloxanes which can be used additionally to the organohydropolysiloxanes preferably comprise those comprising units of the formula $$R^1_cR^2_dSiO_{(4-c-d)/2} \quad (II)$$

where
- $R^1$ can be identical or different and denotes SiC-bonded, unsubstituted or substituted, aliphatically saturated hydrocarbon radicals having 1 to 18 carbon atoms,
- $R^2$ can be identical or different and denotes SiC-bonded, aliphatically unsaturated hydrocarbon radicals having 2 to 6 carbon atoms,
- c is equal to 0, 1, 2 or 3, on average from 1 to 2.1, and
- d is equal to 0 or 1, on average from 0 to 1, with the proviso that the sum of c+d is less than or equal to 3.

Examples of radicals $R^1$ are the examples specified for R of aliphatically saturated, unsubstituted or substituted hydrocarbon radicals, methyl, ethyl, n- and isopropyl radicals and also the n-hexyl radical being preferred and the methyl radical being particularly preferred.

Examples of radicals $R^2$ are alkenyl radicals, such as the vinyl, allyl, 1-propenyl, 2-propenyl and 1-hexenyl radical, and also cyclopentenyl and cyclohexenyl radicals, vinyl and 1-hexenyl radicals being preferred and the vinyl radical being particularly preferred.

In particular, at least 75% of the Si-bonded radicals $R^1$ in the organopolysiloxane comprising units of the formula (II) are methyl radicals.

The organopolysiloxanes comprising units of the formula (II) that are present if desired in the component A comprise those having a viscosity of preferably from 10 to $1·10^7$ $mm^2/s$ at 25° C.

Preferably, the organopolysiloxane comprising units in the formula (II) is essentially linear.

Examples of organopolysiloxanes comprising units of the formula (II) are $H_2C=CH—[Si(CH_3)_2O]_n—Si(CH_3)_2—CH=CH_2$
where (on average) n=20, 100, 150, 200, 450, 600, 1000 and $H_2C=CH(CH_3)_2Si—O—[Si[CH_3]_2O]_x—[Si(CH=CH_2)(CH_3)_2O]_y—Si(CH_3)_2CH=CH_2$
where x:y=20:1 and with a viscosity of 5000 $mm^2/s$
where x:y=6:1 and with a viscosity of 1500 $mm^2/s$
where x:y=3:1 and with a viscosity of 1000 $mm^2/s$.

The relative proportions of organohydropolysiloxane comprising units of the formula (I) to organopolysiloxane comprising units of the formula (II) in the discontinuous oil phase (A) are preferably from 100:0 to 1:100, with particular preference from 100:0 to 1:50.

The organopolysiloxanes used as stabilizers (B) can comprise any desired organopolysiloxanes containing organyloxy groups which are known to date.

Preferably, the organopolysiloxanes used as stabilizers (B) comprise those comprising units of the formula (III)

$$R^3_eSi(OR^4)_fO_{(4-e-f)/2} \quad (III)$$

where
- $R^3$ can be identical or different and has a definition specified above for R,
- $R^4$ can be identical or different and denotes unsubstituted or substituted hydrocarbon radicals having 1 to 6 carbon atoms, which can be substituted by alkyloxy groups,
- e is equal to 0, 1, 2 or 3, preferably on average from 0.5 to 2, with particular preference on average from 0.7 to 1.9, and
- f is equal to 0, 1, 2 or 3, preferably on average from 0.01 to 1.5, with particular preference on average from 0.3 to 1.2, with the proviso that the sum e+f is less than or equal to 3 and at least one unit of the formula (III) where f is other than 0 is present per molecule.

Examples of radicals $R^3$ are the examples specified for R, the methyl, ethyl, propyl, butyl, cyclohexyl, methylcyclohexyl, phenyl and vinyl radical being preferred and the methyl, phenyl and vinyl radical being particularly preferred.

Examples of radicals $R^4$ are the examples given for R of unsubstituted or substituted hydrocarbon radicals having 1 to 6 carbon atoms, the methyl, ethyl, methoxyethyl, propyl, butyl and phenyl radical being preferred and the methyl, ethyl, propyl and butyl radical being particularly preferred.

The organopolysiloxanes containing organyloxy groups which are used in accordance with the invention as component B are preferably liquid at room temperature and have a viscosity of preferably from 1 to 100,000 $mm^2/s$, with particular preference from 5 to 20,000 $mm^2/s$, in each case at 25° C.

Examples of organopolysiloxanes comprising units of the formula (III) are $(C_2H_5)_r(C_4H_9)_s(H_2C=CH)_t(C_6H_5)_u(CH_3)_vSi_1(OCH_3)_w(OC_4H_9)_x(OC_2H_5)_{—y}O_z$, where r, s, t, u, v, w, x, y can be identical or different and in each case denotes 0 to 3; z denotes 0.5 to 1.5;

where the sum of r+s+t+u+v=0 to 3 and the sum of w+x+y=0.01 to 3 and the sum of r+s+t+u+v+w+x+y is less than or equal to 3 and the viscosity is from 1 to 100,000 $mm^2/s$ (at 25° C.), where $(H_2C=CH)_t(C_6H_5)_u(CH_3)_vSi_1(OCH_3)_w(OC_4H_9)_x(OC_2H_5)_yO_z$, where
t, u, v can be identical or different and denotes in each case 0 to 2, w denotes 0.01 to 1.5,
x, y can be identical or different and in each case denotes 0 to 1,
z denotes 0.5 to 1.5;
where the sum of t+u+v=0.5 to 2,
and the sum of w+x+y is from 0.01 to 1.5 and
the sum of t+u+v+w+x+y is less than or equal to 3
and the viscosity is from 1 to 100,000 mm$^2$/s (at 25° C.) are preferred and $(CH_2=CH)_t(C_6H_5)_u(CH_3)_vSi_1(OCH_3)_w(OC_4H_9)_xO_z$, where
t denotes 0 to 1.0,
u denotes 0.2 to 1.2,
v denotes 0.2 to 1.0,
w denotes 0.2 to 1.0,
x denotes 0 to 0.3,
z denotes 0.5 to 1.2;
where the sum of t+u+v=0.7 to 1.9;
and the sum of w+x is=0.3 to 1.2 and
the sum of t+u+v+w+x is less than or equal to 3 and
the viscosity is from 5 to 20,000 mm$^2$/s (at 25° C.) are particularly preferred.

The organopolysiloxanes used in accordance with the invention as component A and also the organopolysiloxanes used in accordance with the invention as component B are commercially customary products and/or are preparable by processes customary in silicone chemistry.

As component C it is possible in the emulsions of the invention to use all emulsifiers which have also been used to date in organopolysiloxane emulsions, such as, for instance, anionic, cationic or nonionogenic emulsifiers.

Examples of emulsifiers which can be used as component C are 1. alkyl sulfates, e.g. having a chain length of 8 to 18 carbon atoms, alkyl ether sulfates having 8 to 18 carbon atoms in the hydrophobic radical and 1 to 40 ethylene oxide (EO) and/or propylene oxide (PO) units.
2. sulfonates, e.g. alkylsulfonates having 8 to 18 carbon atoms, alkylarylsulfonates having 8 to 18 carbon atoms, esters and monoesters of sulfosuccinic acid with monohydric alcohols or alkylphenols having 4 to 15 carbon atoms; if desired, these alcohols or alkylphenols can also be ethoxylated with 1 to 40 EO units.
3. alkali metal salts and ammonium salts of carboxylic acids and poly(alkylene glycol) ether carboxylic acids having 8 to 20 carbon atoms in the alkyl, aryl, alkaryl or aralkyl radical and 1 to 40 EO and/or PO units.
4. phosphoric acid partial esters and their alkali metal salts and ammonium salts, e.g. alkyl and alkaryl phosphates having 8 to 20 carbon atoms in the organic radical, alkyl ether phosphates or alkaryl ether phosphates having 8 to 20 carbon atoms in the alkyl or alkaryl radical, respectively, and 1 to 40 EO units.
5. alkyl polyglycol ethers, preferably those having 2 to 40 EO units and alkyl radicals of 4 to 20 carbon atoms.
6. alkylaryl polyglycol ethers having 2 to 40 EO units and 8 to 20 carbon atoms in the alkyl and aryl radicals.
7. ethylene oxide/propylene oxide (EO/PO) block copolymers having 8 to 40 EO and PO units.
8. fatty acid polyglycol esters having 6 to 24 carbon atoms and 2 to 40 EO units.
9. alkyl polyglycosides of the general formula R'—O—Z$_o$ (IV), in which R' denotes a linear or branched, saturated or unsaturated alkyl radical having on average 8 to 24 carbon atoms and Z$_o$ denotes an oligoglycoside radical having on average o=1 to 10 hexose or pentose units or mixtures thereof.
10. polyvinyl alcohols having Hoeppler viscosities of the 4% strength aqueous solutions of from 3 to 70 mPas and a degree of saponification of from 70 to 95%.
11. linear organopolysiloxanes containing polar groups and having alkoxy groups and up to 24 carbon atoms and/or up to 40 EO and/or PO groups.
12. salts of primary, secondary and tertiary fatty amines having 8 to 24 carbon atoms with acetic acid, sulfuric acid, hydrochloric acid and phosphoric acid.
13. quaternary ammonium salts (halides, sulfates, phosphates, acetates or hydroxides) whose alkyl groups independently of one another possess 1 to 24 carbon atoms; if desired, the alkyl or alkaryl or aralkyl groups of the quaternary ammonium compounds can also be partly ethoxylated (1 to 40 EO units).
14. alkylpyridinium salts, alkylimidazolinium salts and alkyloxazolinium salts whose alkyl chain possess up to 18 carbon atoms, especially in the form of their halides, sulfates, phosphates and acetates.

The emulsifiers used in accordance with the invention preferably comprise nonionogenic emulsifiers, such as the specified alkyl polyglycol ethers, alkylaryl polyglycol ethers, fatty acid polyglycol esters, alkyl-polyglycosides and polyvinyl alcohols, with particular preference being given to alkyl polyglycol ethers having 2 to 40 EO units and alkyl radicals of 4 to 20 carbon atoms and also polyvinyl alcohols having Hoeppler viscosities of the 4% strength aqueous solutions of from 3 to 70 mPas and a degree of saponification of from 70 to 95%.

Furthermore, it is also possible, for the preparation of the emulsions of the invention, to use all additives (E) which have been used to date to prepare emulsions, such as e.g. acids for adjusting the pH, organic solvents, biocides, such as bacteriocides, fungicides, algicides and microbicides, fragrances, wetting agents, inhibitors, pigments, thickeners and fillers.

The acids used if desired as additives (E) preferably comprise acetic acid.

The organic solvents used if desired as additives (E) preferably comprise alkanols having 1–4 C atoms and toluene.

Other than the components (A) to (D) and also, if desired, (E), the emulsions of the invention preferably contain no further components.

The components used to prepare the emulsions of the invention can in each case comprise one kind of such a component or a mixture of at least two kinds of a respective component.

The aqueous emulsions of the invention preferably comprise those which comprise (A) from 1 to 70% by weight, preferably from 5 to 60% by weight, of organopolysiloxanes, i.e. organohydropolysiloxanes alone or in a mixture with organopolysiloxanes free from Si-bonded hydrogen and organyloxy groups, (B) from 0.1 to 10% by weight, preferably from 0.5 to 5% by weight, of organopolysiloxanes containing organyloxy groups, (C) from 0.1 to 15% by weight, preferably from 0.5 to 10% by weight, of emulsifiers, (E) less than 5% by weight, preferably less than 2% by weight, of additives and also (D) water to 100% by weight, based in each case on the overall weight of the emulsion.

The quantitative ratio of component (A) to component (C) is preferably greater than 3, with particular preference greater than 5.

The quantitative ratio of component (A) to component (B) is preferably greater than 5, with particular preference greater than 10.

The quantitative ratio of component (A) to component (D) is preferably from 3:1 to 1:20.

The pH of the emulsions of the invention lies preferably within the neutral to acidic pH range, with particular preference at a pH of from 3 to 4.

The preparation of the emulsions of the invention by mixing the components (A) to (D) and, if desired, (E) can take place in a sequence which is arbitrary per se using equipment which is also used hitherto for the preparation of emulsions.

A further subject matter of the invention is a process for preparing emulsions, characterized in that (A) organohydropolysiloxanes alone or in a mixture with organopolysiloxanes free from Si-bonded hydrogen and organyloxy groups, (B) organopolysiloxanes containing organyloxy groups, emulsifiers, (D) water and also, if desired, (E) additives are mixed with one another.

The emulsions of the invention are preferably prepared by initially introducing the emulsifiers (C) and mixing them, if desired, with a little water and subsequently incorporating the emulsion constituents (A) and (B); finally, the (remaining) water (D) is incorporated. The additives (E) are preferably added together with the (remaining) water (D), or else if desired are already introduced initially together with the emulsifiers (C).

In connection with the preparation of the emulsions of the invention it is advantageous to use organopolysiloxanes (B), which are liquid at room temperature and contain organyloy groups, having a low viscosity, since the organopolysiloxanes containing organyloxy groups can accordingly be metered in simply during the preparation operation; the preparation of a premix of component A and organopolysiloxanes containing organyloxy groups is in this case unnecessary.

Examples of mixing equipment which can be used in connection with the process of the invention are stirrers, such as blade, bar, anchor, grid, screw, propeller, disk, impeller, turbine, planetary stirrers, single- and twin-screw mixers, mixing turbines, colloid mills, ultrasonic mixers, in-line mixers, crown gear dispersing equipment, pumps, homogenizers, such as high-pressure, turbine and circulation homogenizers.

The process of the invention is preferably carried out at a temperature of from 10 to 50° C. and the pressure of the surrounding atmosphere, i.e. from 900 to 1100 hPa.

The pressure exerted on the respective components and/or mixtures is with particular preference the (atmospheric) pressure increased possibly by the action of the mixing elements; the correspondingly prevailing temperature is with particular preference the (ambient) temperature increased optionally by the action of the mixing elements.

The emulsions of the invention have the advantage that they exhibit an outstanding hydrolysis stability and thus reduced elimination of hydrogen.

The emulsions of the invention also have the advantage that the stabilizers used are highly compatible with the other components and a broad spectrum of use is accessible to the emulsions of the invention.

The process of the invention has the advantage that it is very simple in its implementation.

The emulsions of the invention can be used wherever emulsions comprising organohydropolysiloxanes have also been used to date, such as, for example, the applications specified at the outset.

In the examples below all indications of parts and percentages relate, unless specified otherwise, to the weight. Unless specified otherwise, the following examples are conducted under a pressure of the surrounding atmosphere, i.e. at about 1000 hPa, and at ambient temperature, i.e. about 20° C. or a temperature which is established when the reactants are combined at ambient temperature without additional heating or cooling. All viscosity indications given in the examples are intended to relate to a temperature of 25° C.

Determination of the evolution of hydrogen from the emulsions prepared in the examples and comparative examples:

60.0 ml of emulsion are weighed out into a 100 ml narrow-neck glass bottle (brown) After 60 minutes' standing time in the unsealed glass bottle, the glass bottle is gastightly sealed. After a defined standing time (generally 9 days=216 hours, otherwise shorter in the case of high gas evolution) in a thermally conditioned water bath (25° C.), the contents of the bottle being shaken once daily, the amount of hydrogen in the gas space (in % by volume based on the total gas space) is determined by gas chromatography.

In the examples, the following abbreviations are used with respect to the starting materials:

organohydropolysiloxanes

A α,ω-trimethylsiloxypoly(dimethyl-methylhydro)siloxane, viscosity 25–55 mm$^2$/s; 1.1–1.2% by weight-H.

B α,ω-trimethylsiloxypolymethylhydrosiloxane; viscosity 15–25 mm$^2$/s; 1.55–1.7% by weight-H.

C α,ω-trimethyisiloxypoly(dimethyl-methylhydro)siloxane; viscosity 55–75 mm$^2$/s; 0.7–0.8% by weight-H.

Polydimethylsiloxanes containing vinyl groups

D vinyl-terminal polydimethylsiloxane; viscosity 800–1200 mm$^2$/s.

E vinyl-terminal polydimethylsiloxane; viscosity 480–580 mm$^2$/s.

Stabilizers

F $(C_6H_5)_{0.6}(CH_3)_{0.8}Si_{1.0}(OCH_3)_{0.5}(OC_4H_9)_{0.1}O_{1.0}$ having a viscosity of 125 mm$^2$/s;

G $(C_6H_5)_{1.0}(CH_3)_{0.6}Si_{1.0}(OCH_3)_{0.8}O_{0.8}$ having a viscosity of 35 mm$^2$/s;

H silanol-terminal polydimethylsiloxane; 3.2–4.0% by weight —OH; viscosity about 35 mm$^2$/s.

Emulsifiers
  I isotridecyl polyglycol ether having on average 10 ethylene oxide units; 80% strength solution in water (commercially obtainable under the trade-name Arlypon® IT 10/80 from Chemische Fabrik Grünau GmbH);
  K polyvinyl alcohol; 10% strength solution in water (commercially obtainable under the brand name Polyviol® W 25/140 from Wacker-Chemie GmbH);
  L polyvinyl alcohol; 20% strength solution in water (commercially obtainable under the brand name Polyviol® V 03/240 from Wacker-Chemie GmbH);
  M nonylphenyl polyglycol ether having on average 15 ethylene oxide units (commercially available under the brand Arkopal® N 150 from Hoechst AG).

EXAMPLE 1

The emulsifier specified in Table 1 is introduced as initial charge, mixed with equal parts by weight of fully demineralized water and admixed with glacial acetic acid. Under homogenization with a so-called Ultra-Turrax (from Janke+Kunkel), organohydropolysiloxane and organopolysiloxane containing alkoxy groups are added in portions as stabilizer. The remaining amount of fully demineralized water and the biocide formaldehyde are incorporated into the resulting homogeneous paste using the Ultra-Turrax. The emulsion obtained in this way is examined for hydrogen evolution, stability and particle diameter. The results are given in Table 1.

Comparative Examples 1.1 to 1.10

The emulsifier specified in Table 1 is introduced as initial charge, mixed with equal parts by weight of fully demineralized water and admixed with glacial acetic acid except for Comparative Examples 1.4 and 1.6. The further procedure is as described in Example 1 with the difference that, instead of a stabilizer of the invention, silanol-terminated polydimethylsiloxane is used as the stabilizer (Comparative Examples 1.9 and 1.10) or, if appropriate, the additives specified in Table 1 are incorporated (Comparative Examples 1.1 to 1.8). The emulsions obtained in this way are examined for hydrogen evolution and stability. The results are given in Table 1.

TABLE 1

| Components (parts by weight) | Ex. 1 | Comparative Examples | | | | | | | | | |
|---|---|---|---|---|---|---|---|---|---|---|---|
| | | 1.1 | 1.2 | 1.3 | 1.4 | 1.5 | 1.6 | 1.7 | 1.8 | 1.9 | 1.10 |
| Organohydropolysiloxane | A (165) | A (175) | A (175) | A (175) | A (175) | A (175) | A (175) | A (167.5) | A (167.5) | A (170) | A (160) |
| Stabilizer | F (10) | — | — | — | — | — | — | — | — | H (5) | H (15) |
| Emulsifier | I (25) | I (25) | I (25) | I (25) | I (25) | I (25) | I (25) | I (25) | I (25) | I (25) | I (25) |
| Water | (300) | (300) | (300) | (300) | (300) | (300) | (300) | (300) | (300) | (300) | (300) |
| Glacial acetic acid | (0.43) | (0.43) | (0.43) | (0.43) | — | (0.43) | — | (0.43) | (0.43) | (0.43) | (0.43) |
| Glycine (aminoacetic acid) | — | — | (0.75) | — | — | — | — | — | — | — | — |
| Nitrilotriacetic acid | — | — | — | (0.67) | (0.67) | — | — | — | — | — | — |
| D,L-lactic acid | — | — | — | — | — | (0.75) | (0.75) | — | — | — | — |
| Glycerol | — | — | — | — | — | — | — | (5) | (5) | — | — |
| Ethanol | — | — | — | — | — | — | — | (2.5) | — | — | — |
| Ethylene glycol | — | — | — | — | — | — | — | — | (2.5) | — | — |
| Formaldehyde (36.5% by weight in water) | (0.5) | (0.5) | (0.5) | (0.5) | (0.5) | (0.5) | (0.5) | (0.5) | (0.5) | (0.5) | (0.5) |
| Hydrogen evolution [% by volume in the gas space] (after standing time of [days]) | 2.9 (9) | 7.0 (9) | 8.3 (6) | 17.0 (7) | 16.7 (7) | 56 (4) | 44 (4) | 10.6 (9) | 11.3 (9) | 3.9 (9) | 1.5 (9) |
| Emulsion stability* | ++ | + | + | − | − | n.d. | − | + | + | − | − |
| Average particle diameter [nm]** | 335 | n.d. | n.d. | n.d. | n.d. | n.d. | n.d. | n.d. | n.d. | n.d. | n.d. |

*++ stable in the centrifuge test (4000 rpm, 1 hour)
 + stable after 2 weeks' standing time
 − unstable; two-phase after 1 day's standing time
 n.d not determined
**Malvern Autosizer model 700 (n.d. = not determined)

EXAMPLES 2 AND 3

Under homogenization with a so-called Ultra-Turrax (from Janke+Kunkel), the emulsifer initial charge (see Table 2) is admixed in portions with organohydropolysiloxane, and, if desired, further organopolysiloxane and organopolysiloxane containing alkoxy groups, as stabilizer. Fully demineralized water and also, if desired, glacial acetic acid and biocide are incorporated into the respectively resulting homogeneous paste using the Ultra-Turrax. The emulsions obtained in this way are examined for hydrogen evolution, stability and particle diameter. The results are given in Table 2.

Comparative Examples 2 and 3

The procedure described above for Examples 2 and 3 is repeated with the difference that no stabilizer is used. The emulsions obtained in this way are investigated for hydrogen evolution, stability and particle diameter. The results are given in Table 2.

formaldehyde are incorporated into the resulting homogeneous paste using the Ultra-Turrax. The emulsions obtained in this way are examined for hydrogen evolution, stability and particle diameter. The results are given in Table 2.

Comparative Examples 4 and 5

The procedure described above for examples 4 and 5 is repeated with the difference that no stabilizer is used. The emulsions obtained in this way are investigated for hydrogen evolution and stability. The results are given in Table 2.

TABLE 2

| Components (parts by weight) | Examples | | | | Comparative Examples | | | |
|---|---|---|---|---|---|---|---|---|
| | 2 | 3 | 4 | 5 | 2 | 3 | 4 | 5 |
| Organohydropolysiloxane | B (95) | A (38) | A (33) | C (175) | B (100) | A (40) | A (35) | C (175) |
| Organopolysiloxane containing vinyl groups | — | D (152) | E (133) | — | — | D (160) | E (140) | — |
| Stabilizer | G(5) | F(10) | F(8) | G(3.5) | — | — | — | — |
| Emulsifier | K(50) | L(48) M(2) | I(25) | I(25) | K(50) | L(48) M(2) | I(25) | I(25) |
| Water | (49.2) | (173.2) | (300) | (300) | (49.2) | (173.2) | (300) | (300) |
| Glacial acetic acid | (0.8) | — | (0.43) | (0.43) | (0.8) | — | (0.43) | (0.43) |
| Formaldehyde (36.5% by weight in water) | — | (0.5) | (0.5) | (0.1) | — | (0.5) | (0.5) | (0.1) |
| Hydrogen evolution [% by volume in the gas space] (after standing time of [days]) | 0.9 (9) | 3.2 (9) | 0.7 (9) | 2.2 (9) | 12.1 (9) | 9.2 (9) | 4.4 (9) | 5.1 (9) |
| Emulsion stability* | ++ | ++ | + | + | + | ++ | + | + |
| Average particle diameter [nm]** | n.d. | 540 | n.d. | 450 | n.d. | 600 | n.d. | n.d. |

*++ stable in the centrifuge test (4000 rpm, 1 hour)
+ stable after 2 weeks' standing time
**Malvern Autosizer model 700 (n.d. = not determined)

EXAMPLES 4 AND 5

The emulsifer specified in Table 2 is introduced as initial charge, mixed with equal parts by weight of fully demineralized water and admixed with glacial acetic acid. Under homogenization with a so-called Ultra-Turrax (from Janke+ Kunkel), organohydropolysiloxane, and, if desired, further organopolysiloxanes and organopolysiloxane containing alkoxy groups are added in portions, as stabilizer. The remaining amount of fully demineralized water and biocide

EXAMPLE 6

The emulsions from Example 5 and Comparative Example 5 are each tested as the emulsion constituent (crosslinker component) in an aqueous formulation for preparing an antiadhesion silicone coating on paper. For this purpose, 20 parts by weight each of an emulsion bearing the designation Dehesive® 410 E (commercially available from Wacker-Chemie GmbH), comprising vinyl-functional organopolysiloxane and a platinum catalyst and water, are mixed with a) 3 parts by weight of emulsion whose preparation is described in Example 5 and 77 parts by weight of water, and b) 3 parts by weight of emulsion whose preparation is described in Comparative Example 5 and 77 parts by weight of water.

The mixtures a) and b) thus obtained are each applied with a 30 μm coating bar to paper (commercially obtainable under the designation"Bosso Buxil 925" from Bosso Carte Speciali S.p.A., I-10005 Mathi (TO)) and exposed to a temperature of 150° C. for 30 seconds. After 30 minutes' storage at room temperature, the antiadhesive silicone coatings a) and b) obtained in each case are subjected to functional tests. In terms of release force measurements, measurement of retention of bond strength, rub-off and migration (silicone constituents not incorporated by a crosslinking), entirely identical results are obtained within the bounds of measurement accuracy.

Example 6 shows that the addition of the stabilizers of the invention has no deleterious influence on subsequent applications, such as the preparation of antiadhesive silicone coatings on paper/film.

What is claimed is:

1. Storage stable, aliphatic aldehyde-free aqueous emulsions, comprising:

(A) organohydrogenpolysiloxanes alone or in a mixture with organopolysiloxanes free from Si-bonded hydrogen and organyloxy groups, (B) 0.1 to 10% by weight of organopolysiloxanes containing organyloxy groups, as stabilizers, (C) emulsifiers, and (D) water.

2. The aqueous emulsion of claim 1, wherein the organohydrognpolysiloxanes comprise those comprising units of the general formula $$R_a H_b SiO_{(4-a-b)/2} \quad (I)$$

where

R is identical or different and denotes SiC-bonded, optionally substituted hydrocarbon radicals having 1 to 18 carbon atoms, a is equal to 0, 1, 2 or 3, on average from 0.5 to 2, and b is equal to 0, 1 or 2, on average from 0.005 to 1, with the proviso that the sum of a+b is less than or equal to 3 and at least one Si-bonded hydrogen atom is present per molecule.

3. The aqueous emulsion of claim 1, wherein the organopolysiloxanes used as stabilizers (B) comprise those comprising units of the formula $$R^3_e Si(OR^4)_f O_{(4-e-f)/2} \quad (III),$$

where $R^3$ is identical or different and has a definition specified above for R, $R^4$ is identical or different and denotes unsubstituted or substituted hydrocarbon radicals having 1 to 6 carbon atoms, which can be substituted by alkyloxy groups, e is equal to 0, 1, 2 or 3, and f is equal to 0, 1, 2 or 3, with the proviso that the sum e+f is less than or equal to 3 and at least one unit of the formula (III) where f is other than 0 is present per molecule.

4. The aqueous emulsion of claim 1, comprising (A) from 1 to 70% by weight of organohydrogenpolysiloxanes alone or in a mixture with organopolysiloxane free from Si-bonded hydrogen and organyloxy groups, (B) from 0.1 to 10% by weight of organopolysiloxanes containing organyloxy groups, (C) from 0.1 to 15% by weight of emulsifiers, (E) less than 5% by weight of additives and also (D) water to 100% by weight, based in each case on the overall weight of the emulsion.

5. The aqueous emulsion of claim 1, wherein the weight ratio of (A) to (B) is minimally 5:1.

6. The aqueous emulsion of claim 1, wherein the weight ratio of (A) to (B) is minimally 10:1.

7. A storage stable, aqueous emulsion, comprising:

(A) organohydrogenpolysiloxanes alone or in a mixture with organopolysiloxanes free from Si-bonded hydrogen and organyloxy groups, (B) 0.1 to 10% by weight of organopolysiloxanes containing organyloxy groups, as stabilizers, (C) emulsifiers, (D) water, and (E) formaldehyde and no other aldehydes.

8. The aqueous emulsion of claim 7, wherein the organohydrogenpolysiloxanes comprise those comprising units of the general formula $$R_a H_b SiO_{(4-a-b)/2} \quad (I)$$

where

R is identical or different and denotes SiC-bonded, optionally substituted hydrocarbon radicals having 1 to 18 carbon atoms, a is 0, 1, 2 or 3, on average from 0.5 to 2, and b is 0, 1 or 2, on average from 0.005 to 1, with the proviso that the sum of a+b is less than or equal to 3 and at least one Si-bonded hydrogen atom is present per molecule.

9. The aqueous emulsion of claim 7, wherein the organopolysiloxanes used as stabilizers (B) comprise those comprising units of the formula $$R^3_e Si(OR^4)_f O_{(4-e-f)/2} \quad (III),$$

where $R^3$ is identical or different and has a definition specified above for R, $R^4$ is identical or different and denotes unsubstituted or substituted hydrocarbon radicals having 1 to 6 carbon atoms, which can be substituted by alkyloxy groups, e is 0, 1, 2 or 3, and f is 0, 1, 2 or 3, with the proviso that the sum e+f is less than or equal to 3 and at least one unit of the formula (III) where f is other than 0 is present per molecule.

10. The aqueous emulsion of claim 7, comprising
(A) from 1 to 70% by weight of organohydrogenpolysiloxanes alone or in a mixture with organopolysiloxanes free from Si-bonded hydrogen and organyloxy groups,
(B) from 0.1 to 10% by weight of organopolysiloxanes containing organyloxy groups,
(C) from 0.1 to 15% by weight of emulsifiers,
(E) less than 5% by weight of additives and also
(D) water to 100% by weight, based in each case on the overall weight of the emulsion.

11. The aqueous emulsion of claim 7, wherein the weight ratio of (A) to (B) is minimally 5:1.

12. The aqueous emulsion of claim 7, wherein the weight ratio of (A) to (B) is minimally 10:1.

13. The aqueous emulsion of claim 7, further comprising an aliphatic aldehyde.

14. A process for preparing stable aqueous emulsions of Si—H functional polyorganosiloxanes, comprising mixing (A) organohydrogenpolysiloxanes, optionally in admixture with organopolysiloxanes free from Si-bonded hydrogen and organyloxy groups, (B) from 0.01 to 10 weight percent of one or more organopolysiloxanes containing organyloxy groups, (C) emulsifiers, (D) water and also, if desired, (E) additives, to form a stable emulsion which exhibits less hydrogen gas generation than a comparable formulation not containing said organopolysiloxanes containing organoyloxy groups (B).

* * * * *